(12) United States Patent
Provost

(10) Patent No.: US 9,132,920 B2
(45) Date of Patent: Sep. 15, 2015

(54) NACELLE EQUIPPED WITH A DEVICE FOR DETECTING THE LOCKING STATE OF A LOCKING DEVICE

(75) Inventor: Fabrice Provost, Notre-Dame-du-Bec (FR)

(73) Assignee: AIRCELLE, Gonfreville l'Orcher (FR)

( * ) Notice: Subject to any disclaimer, the term of this patent is extended or adjusted under 35 U.S.C. 154(b) by 1266 days.

(21) Appl. No.: 12/673,944

(22) PCT Filed: Aug. 6, 2008

(86) PCT No.: PCT/EP2008/060345
§ 371 (c)(1),
(2), (4) Date: Apr. 7, 2011

(87) PCT Pub. No.: WO2009/024469
PCT Pub. Date: Feb. 26, 2009

(65) Prior Publication Data
US 2011/0182728 A1    Jul. 28, 2011

(30) Foreign Application Priority Data
Aug. 20, 2007 (FR) ...................................... 07/05937

(51) Int. Cl.
*B64D 29/06* (2006.01)
(52) U.S. Cl.
CPC ...................................... *B64D 29/06* (2013.01)
(58) Field of Classification Search
CPC ........................................................ B64D 29/06
USPC .......... 415/126; 292/113, DIG. 65; 244/129.4
See application file for complete search history.

(56) References Cited

U.S. PATENT DOCUMENTS

| 1,069,676 | A | * | 8/1913 | Clement | 292/338 |
| 4,365,775 | A | * | 12/1982 | Glancy | 244/53 R |
| 4,613,099 | A |   | 9/1986 | Smith et al. | |
| 5,518,206 | A | * | 5/1996 | Arnold et al. | 244/129.4 |
| 6,666,408 | B1 | * | 12/2003 | De Carvalho et al. | 244/129.4 |
| 2004/0104583 | A1 |   | 6/2004 | Porte | |

FOREIGN PATENT DOCUMENTS

| EP | 0480827 | 4/1992 |
| EP | 1091059 | 4/2001 |

OTHER PUBLICATIONS

International Search Report; PCT/EP2008/060345; Oct. 1, 2008.

* cited by examiner

*Primary Examiner* — Nathaniel Wiehe
*Assistant Examiner* — Kayla McCaffrey
(74) *Attorney, Agent, or Firm* — Brinks Gilson & Lione

(57) ABSTRACT

A nacelle includes a front air inlet section, a mid-section and a rear section formed from two half-shells connected each other by a locking device actuated by a control handle equipped with a secondary locking system. The secondary locking system includes a blocking member to block the control handle in a locking position. In particular, the blocking member has a rod accommodated in the control handle and prolonged by a head. The blocking member and a region of the internal face of one of two cowls of the middle section come into abutment one against the other in order to prevent the closure of cowl if the control handle is not situated in its locking position.

7 Claims, 3 Drawing Sheets

NACELLE EQUIPPED WITH A DEVICE FOR DETECTING THE LOCKING STATE OF A LOCKING DEVICE

TECHNICAL FIELD

The invention relates to an aircraft turbojet engine nacelle.

BACKGROUND

An aircraft is driven by a plurality of turbojet engines, each accommodated in a nacelle likewise housing an assembly of accessory actuating devices associated with its functioning and ensuring various functions when the turbojet engine is in operation or at a standstill. These accessory actuating devices comprise, in particular, a mechanical system for the actuation of thrust reversers.

A nacelle generally has a tubular structure comprising an air inlet in front of the turbojet engine, a middle section intended for surrounding a blower of the turbojet engine, and a rear section capable of housing thrust reversal means and intended for surrounding the combustion chamber of the turbojet engine, and generally terminates in an ejection nozzle, the outlet of which is located downstream of the turbojet engine.

Modern nacelles are often intended for housing a double-flow turbojet engine capable of generating, by means of the rotating blades of the blower, a stream of hot air (also called a primary stream) coming from the combustion chamber of the turbojet engine.

A nacelle generally has an external structure, called an outer fixed structure (OFS), which, with a concentric internal structure, called an inner fixed structure (IFS), defines an annular flow channel, also called a flow section, intended for channeling a stream of cold air, called a secondary stream, which circulates outside the turbojet engine. The primary and secondary streams are ejected from the turbojet engine at the rear of the nacelle.

Each propulsive assembly of the aircraft is thus formed by a nacelle and a turbojet engine and is suspended from a fixed structure of the aircraft, for example under a wing or on the fuselage, by means of a pylon or mast attached to the turbojet engine or to the nacelle.

The rear section of the external structure of the nacelle is usually formed from a first and a second half-shell of substantially semi-cylindrical shape, on either side of a vertical longitudinal plane of symmetry of the nacelle, and mounted movably so as to be capable of being deployed between an operating position and a maintenance position for the purpose of giving access to the turbojet engine. The two half-shells are generally mounted pivotably about a longitudinal axis forming a hinge in the upper part (at 12 o'clock) of the reverser. The half-shells are held in a closing position by means of locking devices arranged along a junction line located in the lower part (at 6 o'clock).

Conventionally, the two half-shells are, in particular, connected to one another in the region of a front frame, which makes it possible to attach the rear section to a fixed part of the middle section, by means of at least one locking device comprising a locking member equipping the first half-shell, a complementary locking member equipping the second half-shell, and a control handle fastened in the first half-shell and connected to the locking member by transmission means.

The control handle is usually designed so as to be capable of being displaced alternately from a stable opening position, in which the locking member is open, to a stable locking position, in which the locking member is closed, passing through an unstable intermediate phase where the locking member is closed.

This control handle is equipped with a secondary locking system comprising a blocking member making it possible, once placed in the blocking position, to block said control handle in its locking position. For this purpose, the control handle comprises a trigger which has to be actuated beforehand by the operator in order to make it possible to rotate said control handle in the direction of its locking position. Once the latter is reached, the operator can release the trigger, thus causing the translational motion of the blocking member in the control handle and its engagement in an orifice located in an internal piece, for the purpose of blocking the control handle in its locking position.

The middle section is conventionally formed from at least two shrouds mounted movably in rotation about a longitudinal axis so as each to be capable of being deployed between an operating position and a maintenance position. These shrouds are designed, in particular, so that their rear ends come into position around the front frame when they are in the operating position, and therefore cover the control handle of the locking device.

In the opening position, the control handle projects from the junction line located in the lower part and is generally visible from outside.

In the intermediate position, or when the blocking member is not in its blocking position, that is to say when the trigger is not engaged, a slight lack of attention on the operator's part is sufficient for him to fail to detect that the control handle is not in its locking position. Experience has shown that shrouds have been turned down and locked in the operating position when the control handle has been in the intermediate position or the blocking member has not been in its blocking position. Such a situation is especially disturbing because, since the control handle is unstable in this position, the locking member may come to be disengaged from the complementary locking member under the effect of external stresses.

BRIEF SUMMARY

The disclosure intends to overcome the abovementioned disadvantage simply and reliably and, for this purpose, the invention comprises a turbojet engine nacelle comprising a front air inlet section, a middle section intended for surrounding a blower of the turbojet engine, and a rear section formed from at least two half-shells connected to one another by means of at least one locking device actuated by a control handle equipped with a secondary locking system comprising a blocking member making it possible, once placed in the blocking position, to block said control handle in its locking position, said middle section being formed from at least two shrouds capable of being deployed between an operating position and a maintenance position, characterized in that the blocking member and at least one zone of the internal face of one of the two shrouds are designed so as to come into abutment one against the other in order to prevent the closing of said shroud if the control handle is not located in its locking position and/or if the blocking member is not in its blocking position.

A considerable advantage in terms of mass, overall size and cost arises from the fact that such a nacelle is thus secured perfectly, without the need to duplicate the control handle of the locking device or the locking device itself.

Preferably, the blocking member comprises a rod accommodated in the control handle and prolonged by a head. Conventionally, this rod experiences translational motion in the control handle in order to pass alternately from a position in which the head projects from said control handle when the latter is in the opening position or in the intermediate position, to a position in which the head is accommodated in the control handle when the latter is in the locking position.

Also preferably, the head comprises at least one protuberance. The latter preferably extends transversely with respect to the rod.

Advantageously, the zone of the internal face of the shroud comprises at least one shoulder oriented inward.

Also advantageously, the protuberance and the shoulder are designed in such a way that said protuberance is on the path of the shoulder when the shroud is turned down in the direction of its operating position while the control handle is not located in its locking position and/or the blocking member is not in its blocking position.

According to a particularly preferred embodiment, the shoulder comprises part of a stiffener equipping the internal face of the shroud.

The present invention also relates to an aircraft, characterized in that it comprises at least one nacelle according to the invention.

BRIEF DESCRIPTION OF THE DRAWINGS

The implementation of the invention will be understood more clearly from the detailed description which is given below with reference to the accompanying drawing in which.

DETAILED DESCRIPTION

Figure 1:
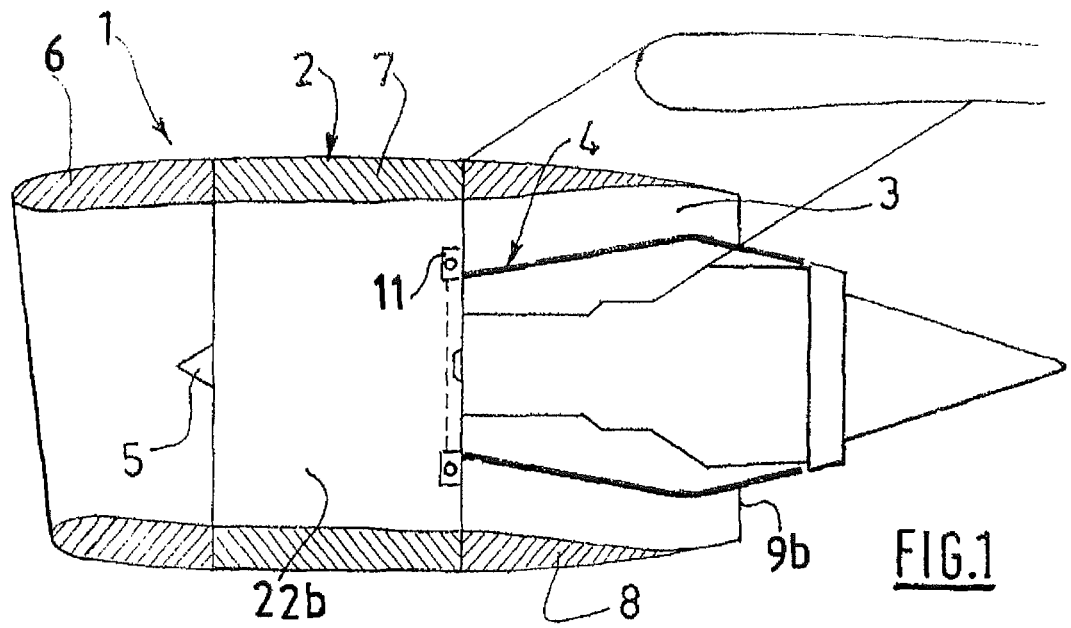
FIG. 1 is a diagrammatic view in longitudinal section of a nacelle according to the invention in the closing state.

An aircraft nacelle 1 according to the invention, as illustrated in FIG. 1, comprises in a way known per se an external structure 2, called an OFS, which defines an annular flow channel 3 with a concentric internal structure 4 surrounding the actual structure of the turbojet engine (not illustrated) at the rear of a blower 5.

More specifically, this external structure 2 is broken down into a front air inlet section 6, a middle section 7 intended for surrounding the blower 5, and a rear section 8 formed from at least two half-shells 9a, 9b.

In the operating position, the two half-shells 9a, 9b are positioned nearest to the turbojet engine and are held conventionally in this position with the aid of a plurality of locking device 10, well known to a person skilled in the art and provided along a junction line located in the lower part (at 6 o'clock).

Figure 2:
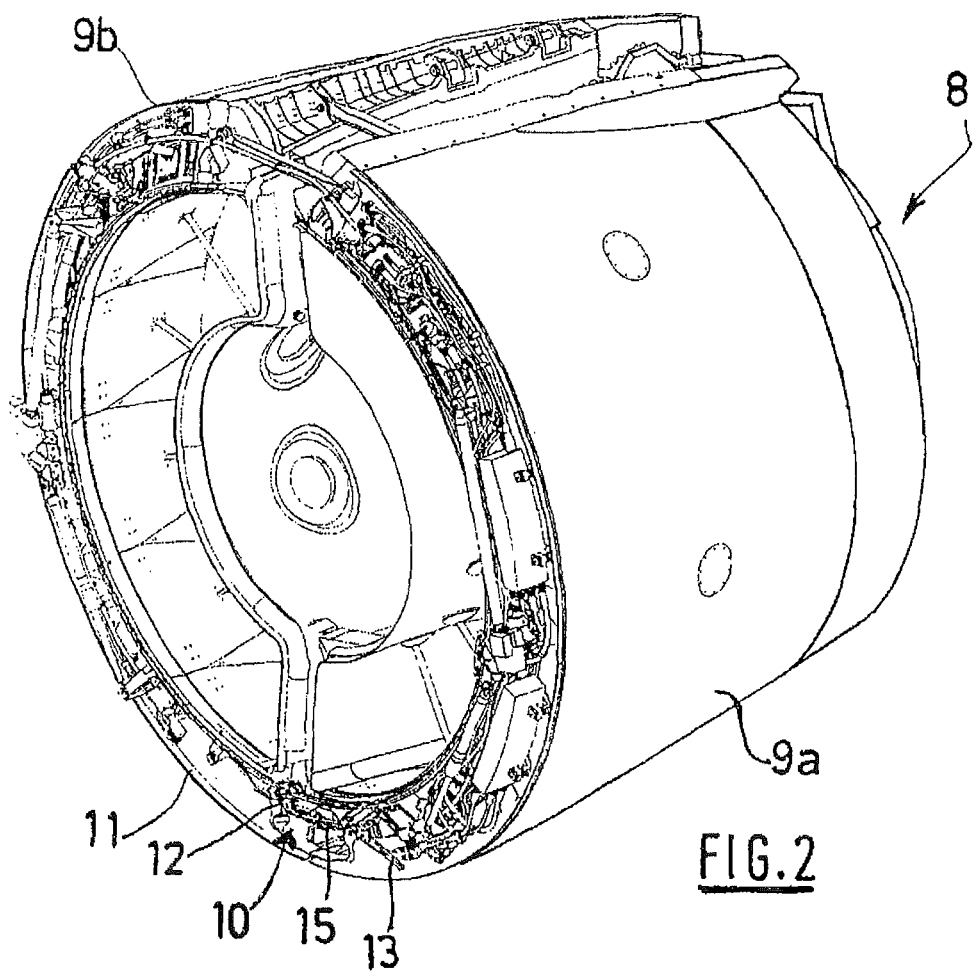
FIG. 2 is a perspective view of the rear section of the nacelle illustrated in FIG. 1.

As illustrated in FIG. 2, such a locking device 10 may, in particular, be integrated in the front part of the rear section 8, and more especially in the region of a front frame 11, the latter being the element making it possible to attach the rear section 8 to a fixed part of the middle section 7.

Figure 3:
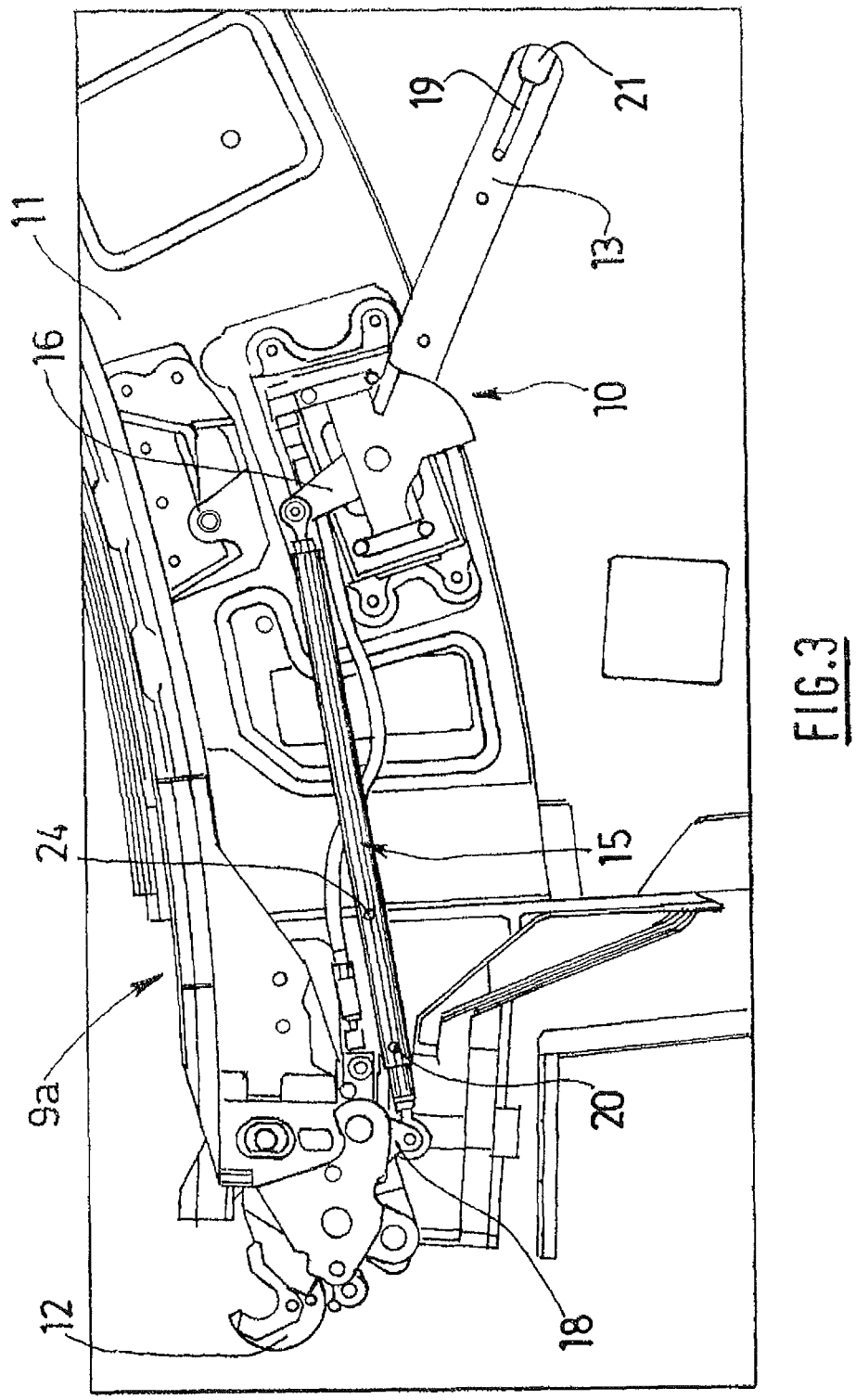
FIG. 3 is an enlarged partial view of the locking device equipping the nacelle illustrated in FIG. 2.

The locking device 10, as illustrated in FIG. 3, comprises diagrammatically a locking member 12 equipping one of the two half-shells 9a, and a complementary locking member (not illustrated) equipping the other half-shell 9b.

Conventionally, this locking device 10 comprises an offset control handle 13 connected to the locking member 12 by transmission means comprising a connecting rod 15 having, on the one hand, a first end attached to a link 16, the rotation of which is actuated as a result of the pivoting of the control handle 13, and, on the other hand, a second end attached indirectly to said locking member 12.

The locking member 12 comprises a hook, the pivoting of which is conventionally subject to the movement of the control handle 13 by means of a set of links 18 connecting the second end of the rod 15 to said hook 12.

The complementary locking member will be implemented in the form of a longitudinal pin, around which the hook 12 will be able to be hooked or, on the contrary, to be moved away, depending on whether the control handle 13 will be actuated for the purpose of closing or opening the locking device 10.

The control handle 13 of such a locking device 10 is designed so as to be capable of being displaced alternately from a stable opening position, in which the hook 12 is open, to a stable locking position, in which the hook 12 is closed, passing through an unstable intermediate phase where the hook 12 is closed.

Conventionally, this control handle 13 is equipped with a secondary locking system comprising a blocking member implemented in the form of a rod 19 making it possible, once placed in the blocking position, to block said control handle 13 in its locking position.

For this purpose, the control handle 13 comprises a trigger (not illustrated) which has to be actuated beforehand by the operator in order to make it possible to rotate said control handle 13 in the direction of its locking position. Once the latter is reached, the operator can release the trigger, thus causing the translational motion of the rod 19 in the control handle 13 and its engagement in an orifice (not illustrated) located in an internal piece, in order to block the control handle 13 in its locking position.

Figure 5:
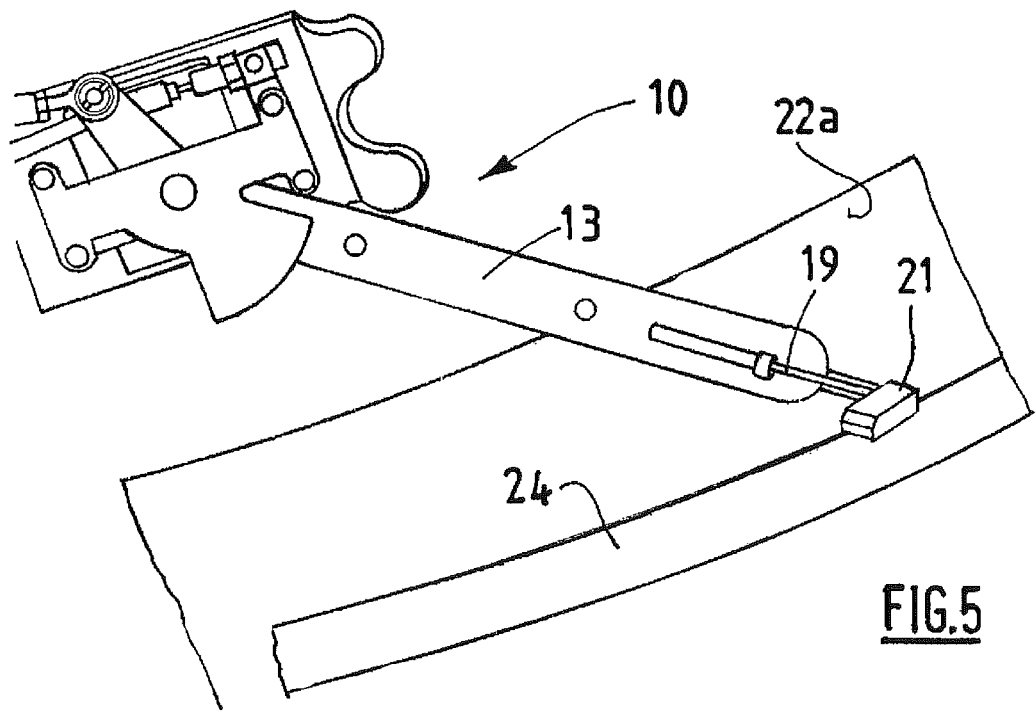
FIG. 5 is a diagrammatic view of the locking device of FIG. 3 when the shroud is in abutment against the head of the blocking member.

The rod 19 is prolonged by a head 20 which, on the one hand, projects from the control handle 13 when the latter is in the opening position or in the intermediate position, as illustrated in FIG. 5, and, on the other hand, is accommodated in the control handle 13 when the latter is in the locking position.

According to the invention, the head 20 is prolonged by a protuberance 21 oriented forward and extending transversely with respect to the rod 19.

The middle section 7 is conventionally formed from at least two shrouds 22a, 22b mounted movable in rotation about a longitudinal axis (not illustrated) so as each to be capable of being deployed between an operating position and a maintenance position.

These shrouds 22a, 22b are designed so as each to have a rear end coming into position around the front frame 11 of the rear section 8 when they are in the operating position. Thus, the rear end of the shroud 22a comes to cover the control handle 13 of the locking device 10 when said shroud 22a is in the operating position.

Figure 4:
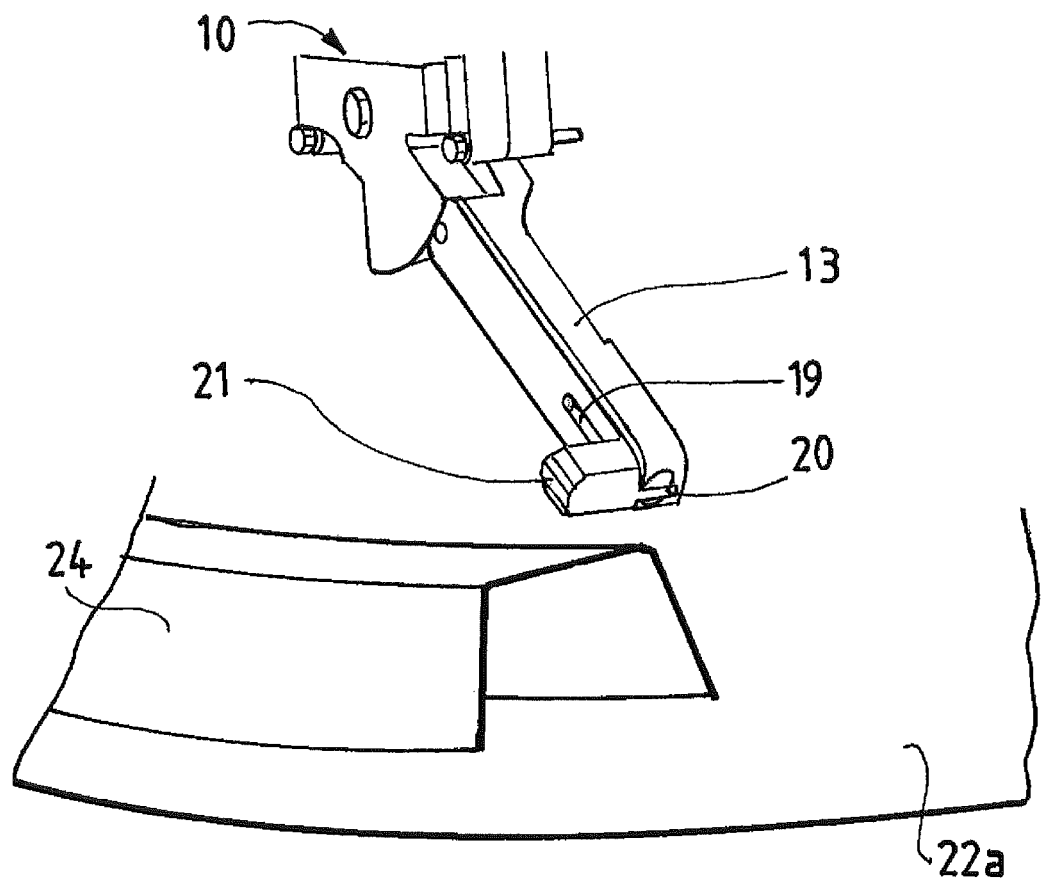
FIG. 4 is a diagrammatic view of the control handle of the locking device of FIG. 3 in the locking position.

Conventionally, and as illustrated in FIG. 4, the shroud 22a has, in the region of its rear end, an internal face in which a peripheral stiffener 24, diagrammatically Ω-shaped, is fastened.

As illustrated in FIG. 5, this stiffener 24 thereby forms a peripheral shoulder, a part or zone of which comes into abutment against the protuberance 21 when the shroud 22a is turned down in the direction of its operating position while the control handle 13 is not located in its locking position. It is thereby made impossible to close the shroud 22*a*, and the operator responsible for maintenance is immediately informed of the situation.

It should be noted that this interaction between the protuberance 21 and the stiffener 24 may occur when the control handle 13 is in either the opening position or the intermediate position and/or when the trigger is not engaged.

Although the invention has been described in connection with particular exemplary embodiments, it is quite clear that it is no way limited to these and that it comprises all the technical equivalents of the means described and also their combinations if these come within the scope of the invention.

The invention claimed is:

1. A turbojet engine nacelle comprising:
   a front air inlet section,
   a middle section surrounding a blower of the turbojet engine, and
   a rear section formed from at least two half-shells connected to one another by means of at least one locking device actuated by a control handle equipped with a secondary locking system comprising a blocking member that, once placed in a blocking position, blocks said control handle in a locking position, said middle section being formed from at least two shrouds that deploy between an operating position and a maintenance position,
   wherein the blocking member comprises a rod parallel to the control handle and slidably housed within the control handle, the control handle being linearly prolonged by a head of the rod, the blocking member and at least one zone of an internal face of one of the two shrouds abutting one against another in order to prevent the closing of said shroud if the control handle is not located in the locking position and/or if the blocking member is not in the blocking position, and
   wherein the control handle is displaced by rotation alternately between a stable opening position in which said at least one locking device is open and a stable locking position in which said at least one locking device is closed, passing through an intermediate phase where said at least one locking device is closed.

2. The nacelle as claimed in claim 1, wherein the head comprises at least one protuberance.

3. The nacelle as claimed in claim 2, wherein the protuberance extends transversely with respect to the rod.

4. The nacelle as claimed in claim 3, wherein the zone of the internal face of the shroud comprises at least one shoulder oriented inward.

5. The nacelle as claimed in claim 4, wherein the protuberance is on a path of the shoulder when the shroud is turned down in a direction of an operating position while the control handle is not located in the locking position and/or the blocking member is not in the blocking position.

6. The nacelle as claimed in claim 5, wherein the shoulder comprises a part of a stiffener equipping the internal face of the shroud.

7. An aircraft, comprising at least one nacelle as claimed in claim 1.

\* \* \* \* \*